INVENTORS
ERNESTO ENRIQUES
LUIS ESPINOSA

United States Patent Office 3,600,329
Patented Aug. 17, 1971

3,600,329
DIATOMACEOUS EARTH TREATED WITH POLYELECTROLYTE PRODUCT AND A NEW PROCESS FOR PRODUCING IT
Ernesto Enriquez and Luis Espinosa, Mexico City, Mexico, assignors to Kieselguhr de Mexico, S.A., Mexico City, Mexico
Filed Oct. 29, 1968, Ser. No. 771,554
Claims priority, application Mexico, Oct. 30, 1967, 99,299
Int. Cl. B01j *11/58*
U.S. Cl. 252—428
3 Claims

ABSTRACT OF THE DISCLOSURE

Diatomaceous earth product for various uses, particularly suitable as a filtering aid with improved filtration and clarification rates, and method of making said product, by adding to the diatomaceous earth prior to, during or after calcination an anionic, non-ionic or cationic polyelectrolyte in amounts ranging from about 5 to about 10,000 p.p.m. of diatomaceous earth.

---

The present invention relates to products of diatomaceous earth, generally, and to a new process for manufacturing such products. In a more specific way, it refers to a filter-aid product with improved filtration characteristics and a new method for producing it.

Even more specifically, it refers to an improved method for the production of a calcined diatomaceous earth product, which has improved filter-aid qualities, with excellent filtration rate and a high degree of clarification.

Diatomaceous earth consists of silica skeletons of unicellular organisms of either lacustrine or marine origin, which mineralogically correspond to an opal with a certain number of water molecules.

Raw diatomaceous earth is extracted from actual deposit in different geographical areas which are generally contaminated with varying quantities of clay, quartz, other minerals, and organic materials. Up to the present time, industry practice has been to selectively mine those deposits or parts of diatomaceous earth deposits having the lowest percentage of impurities. These deposits are known as high grade material. The large existing quantities of lower grade material are rejected because conventional technology has not been satisfactory for their treatment. The removal of impurities from the lower grade of material has not been practical since product losses of diatomaceous earth during the processing of such lower grade materials is high, processing costs are also high, and the recovery of high grade product is relatively low. The products of the lower grade deposits are not normally suitable for use as filter-aids since the products of lower grade deposits do not normally have the necessary combination of flow velocity and clarification characteristics indispensable for good filter-aids.

In the high grade deposits of diatomaceous earth, the diatom contents of the raw material processed generally exceeds about 80–84%. In deposits of lower grade materials, the diatom content will normally vary from only a few percent, e.g. in material called diatomaceous clay or silt, up to a percentage approaching that of high grade material. The necessity for selecting those types of earth that contain the lowest percentage of impurities necessarily results in the rejection of large quantities of the available crude earth, resulting in a substantial increase in the cost of raw material.

It is generally known that for a given pressure differential, the filtration rate across a porous filter cake of a particular size of particle fineness will be less than across a relatively porous filter cake of coarser filter-aid particles. On the other hand, the clarity of the filtrate obtained will normally be higher across a cake of lower porosity than across a cake that is relatively more porous due to the higher retentive property of the less porous material. In order to achieve a high clarity, therefore, it has often been necessary to employ either very high pressure differentials or to accept relatively low flow velocities.

It is an object of this invention, therefore, to provide an improved process for the treatment of any crude diatomaceous earth.

It is another object of the invention to provide a process for the treatment of low grade diatomaceous earth.

It is another object of this invention to provide a process for the treatment of diatomaceous earth in which the quantity of earth particles that are lost with the separated impurities is minimized.

It is another object of the present invention to provide an improved diatomaceous earth product from high grade crude diatomaceous earth.

It is another object of the present invention to provide an improved diatomaceous earth product from low grade crude diatomaceous earth.

It is another object of the present invention to provide a high percentage of the final diatomaceous earth product in the form of premium grade filter-aid products with a minimum percentage of lower grade products only useful for other purposes.

It is another object of the present invention to provide a diatomaceous earth product having high filtration rate and high clarification properties.

It is another object of the present invention to provide a process for the use of crude diatomaceous earth raw material having a high clay content.

It is a further object of the present invention to provide a diatomaceous earth product capable of operating with a longer filtration cycle than has heretofore been possible.

It is a further object of the present invention to provide a process in which secondary products can be recycled in order to increase the overall recovery of high filter-aid products.

A further object of the present invention is the new industrial application of a polyelectrolyte to obtain an improved diatomaceous earth.

A further object of this invention is the new industrial application of a polyelectrolyte to improve the qualities of diatomaceous materials treated with a flux agent.

These and other objects of the present invention are achieved in accordance with the invention described below and in the accompanying drawings in which.

Figure 1:
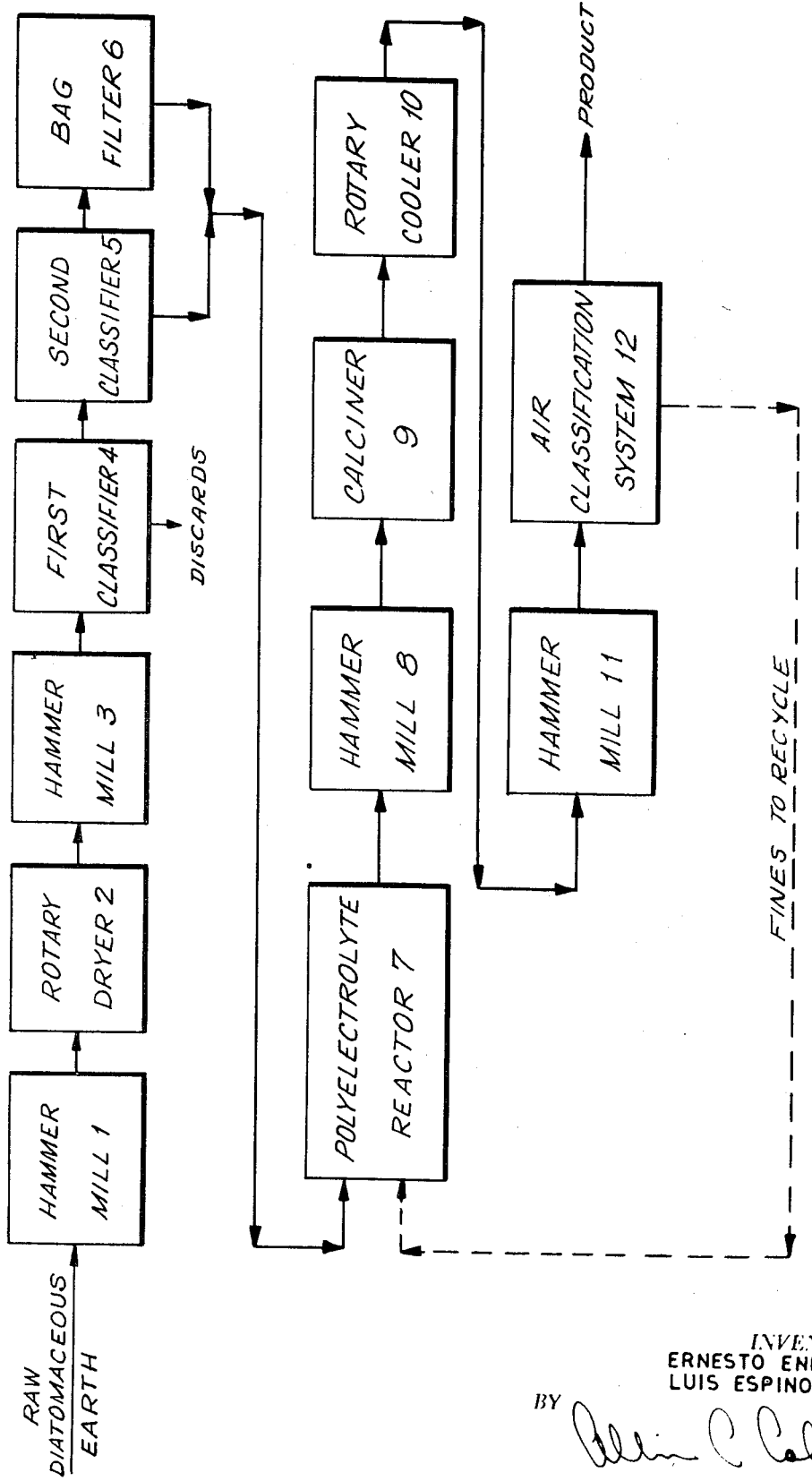
FIG. 1 is a flow diagram illustrating one embodiment of the present invention.

In accordance with the present invention, raw diatomaceous earth, either of marine or of lacustrine origin, may be subjected to a physical-chemical treatment, irrespective of the diatom content of the diatomaceous earth. This physical-chemical treatment consists in the treatment of the diatomaceous earth, prior to calcining, with a polyelectrolyte conditioning agent. As used with reference to this invention, the term "polyelectrolyte" means any long chain, high molecular weight, natural or synthetic polymer having within its structure active groups having a specific adsorptive affinity for clay particles. These agents are generally organic in nature and are characterized by an inert carbon or silicon skeleton having attached thereto a large number of water-compatible groups such as hydroxyl, amine, amide or carboxyl groups. Included in this class of compounds are polysaccharides, polyacrylamides and acrylamide polymer hydrolytes. Other suitable materials include carboxymethylcelluloses, guar gums, the alginates, activated silica, ammonium lignosulfonates and similar substances. Because these compounds have the characteristics of both polymers and electrolytes, they are commonly called polymeric electrolytes or polyelectrolytes. Based upon the electrical charge that they carry, the polyelectrolytes are classified as anionic, cationic or nonionic.

The affinity of any polymeric materials falling within the general description above for adsorbing clay can readily be determined from the literature and/or by routine tests to determine its selectivity toward clay in a suspension of clay and diatomaceous earth.

Illustrative of the commercially available nonionic polyelectrolytes are Dow Chemical's Separan NP-10, a water-soluble, high molecular weight polymer of acrylamide and Separan NP-20, also a polyacrylamide polymer. Likewise, Separan MGL is a nonionic polyelectrolyte of the polyacrylamide family. Likewise, Starfloc N-11 is a nonionic, polyacrylamide-type polyelectrolyte marketed by Morningstar Products. Illustrative examples of the commercially available anionic polyelectrolytes are American Cyanamid's Superfloc 16, a polyacrylamide, water-soluble polyelectrolyte of a slightly anionic character; Superfloc 20, a polyacrylamide of higher molecular weight than Superfloc 16; and Superfloc 84, also a polyacrylamide of higher molecular weight than Superfloc 20. Other illustrative anionic polymers include the aerofloc products of American Cyanamid, such as Aerofloc 550, Aerofloc 3425 and Aerofloc 3453, a very high molecular weight anionic polyacrylamide-type of polyelectrolyte; MRL-601 and 602, mannogalactant starch-derivatives marketed by Stein Hall Company. Illustrative of the commercially available cationic polyelectrolytes are Dow Chemical's Separan C-90, a polyacrylamide-type flocculating agent.

While the inventors do not intend to be bound by any particular theory of operation, it is believed that the polyelectrolyte selectively flocculates the clay content of the raw diatomaceous earth. The clay is believed to be expelled from the diatom valves in small flocs due to the swelling of clay by the water present within the mass of solids. This expulsion of the clay particles effectively liberates the diatoms from the clay particles. In the subsequent calcination, it is believed that the liberated clay particles are dehydrated and aggregated while their crystalline structure is reoriented. Air separation of the clay aggregates from the diatoms in the calcined product is consequently facilitated.

Although larger quantities may be employed, it has been found that the amount of polyelectrolyte useful in obtaining the beneficial results of the present invention extends to about 1,000–5,000 parts per million parts, on a dry solid base, of diatomaceous earth being treated. Generally satisfactory results have been obtained by the addition of from about 5 to about 10,000 p.p.m. as well as from about 100 to about 1,000 p.p.m. of polyelectrolyte.

It has been generally found desirable to maintain a moisture content of the diatomaceous earth during treatment with the polyelectrolyte of at least about 5–15% in order to facilitate the uniform dispersion of the polyelectrolyte throughout the mass of material being treated. The polyelectrolyte is generally added to the diatomaceous earth being treated in the form of a water solution. While the concentration of the polyelectrolyte in the water solution is not critical, manufacturers of commercially available polyelectrolytes commonly specify that the polyelectrolyte be employed in concentrations equal to or less than 0.05% by weight.

Although the diatomaceous earth being treated may be dried prior to the addition of the polyelectrolyte, as discussed below, the addition of the polyelectrolyte will normally be accomplished at ambient conditions. The polyelectrolyte, of course, must be thoroughly dispersed throughout the mass of diatomaceous earth in order to be fully effective. Although the retention time prior to calcination is not critical, sufficient time must be allowed to permit the thorough dispersion of the polyelectrolyte throughout the mass material being treated. In those instances in which the material treated is essentially dry prior to the addition of the polyelectrolyte, it is often desirable to allow a period of from about 10 minutes to 60 hours after the addition of the polyelectrolyte to the material before introducing the thus treated material to the calciner, although it may be used without any rest period with good results. A period of 18 hours has been found particularly suitable for this purpose. When on the other hand, the polyelectrolyte is added to a slurry of the material being treated before any significant drying of the material, it is not necessary to allow any extended time for complete distribution of the polyelectrolyte throughout the mass of diatomaceous earth being treated. In any event, the normal holding time in the vessel in which the polyelectrolyte is added to the slurry assures complete distribution of the polyelectrolyte throughout the mass of diatomaceous earth prior to calcination.

As indicated above, the present invention is applicable to the so-called high grade material containing a small percentage of impurities and to the lower grade materials that are discarded or rejected in present commercial operations. Upon a mineralogical basis, high grade material such as that found in the United States in the State of California typically comprises from about 80% to about 95% diatomaceous earth, from about 2% to about 4% clay, and less than about 1% sand on a dry basis. The so-called lower grade material will vary from those having only a small percentage of diatomaceous earth up to those nearly approximating the higher grade material. In some instances, a relatively small amount of sand will be present in a raw diatomaceous earth, e.g. about 2% to 5% on a dry basis. In some instances, a relatively large amount of sand, e.g. about 25% to 30% on a dry basis, may be present in the lower grade raw diatomaceous earth deposit or portion thereof. Likewise, the clay content of the lower grade material varies widely from amounts similar to that of high grade material up to 30% to 40% or more on a dry basis. The present invention is suitable for the treatment of all grades of raw diatomaceous earth. An improved filter-aid material, having flow rates and clarification properties previously obtainable only from high grade diatomaceous earth deposits, can be obtained from lower grade materials by means of the present invention. Likewise, the present invention permits the obtaining of improved filter-aid material from high grade raw diatomaceous earth as compared to the filter aid properties obtainable from such high grade material using conventional techniques or a better quality filter-aid material can be obtained with the use of conventional techniques plus the polyelectrolyte.

In addition to the improved filter-aid products obtainable by means of the present invention from both high grade and low grade diatomaceous earth deposits, the product obtained in accordance with the present invention has been found to have an exceptionally high oil absorbency as compared to readily available commercial products. Because of this unexpectedly high oil absorbency, the diatomaceous earth product of the present invention is exceptionally well suited for use in dry cleaning operations. In the dry cleaning industry, it is generally known that the grease removed from clothing during the cleaning operation tends to saturate the cleaning solvent with oils and fatty acids. As a result, distillation to regenerate the solvent for further use is periodically required. By preferentially absorbing high quantities of oils and fatty acids from solvent, the diatomaceous earth product of the present invention used as a filter aid in recycling solvent permits a much more effective use of the detergent properties of the solvent than heretofore had been possible. Oil absorption values of at least about 230 grams of oil per 100 grams of earth have been obtained employing the product of the present invention.

The embodiment of the present invention illustrated in FIG. 1 is particularly suited for the treatment of high grade material and lower grade material having a relatively low sand content. In the event the earth being treated has a low sand content, itis feasible to initially dry the raw diatomaceous earth and to separate the sand from the dried material by a conventional dry milling and air classification system. If the raw earth has a negligible sand content, it is, of course, within the scope of the present invention to omit the sand removal operation prior to the addition of the polyelectrolyte. In this embodiment, raw diatomaceous earth is fed to a preliminary size reduction unit, such as conventional hammer-mill 1. In this unit, lumps are broken and the particle size of the material is reduced. The material then passes to a conventional rotary dryer 2 in which the moisture content of the material is reduced to the desired level. After drying, the material is passed to conventional hammer-mill 3 in which the material is typically milled to less than about 100 mesh. The material is then fed to a conventional two-stage aid classification system comprising a first classifier 4 and a second classifier 5. The underflow from classifier 4 comprises the sand content of the raw earth, together with inerts such as volcanic ash and small quantities of clay and diatomaceous earth. This material is generally larger than 200 mesh. The overflow from classifier 4 passes into second classifier 5, the underflow of which comprises the bulk of the less than about 200 mesh material. The fines in the classifier 5 overflow are recovered in bag filter 6 and are fed, together with the underflow from classifier 5, to polyelectrolyte reactor 7. The material fed to reactor 7 contains essentially all of the diatom and clay content of the raw diatomaceous earth. Essentially all of the sand content of the raw earth will have been removed in the preliminary desanding operation described above.

A polyelectrolyte is added to the mass of diatomacous earth in reactor 7 under continuous mixing conditions in order to distribute and disperse the polyelectrolyte throughout the mass of materials being treated. Various well-known techniques may be employed, such as the use of manifold spray nozzles, perforated rotating discs, or other known devices. Reactor 7 can conveniently be a conventional rotating drum having a means for agitating the mass contained therein. The moisture content of the mixture of polyelectrolyte and diatomaceous earth discharged from reactor 7 should preferably be at least about 5% to 15%. In order to allow sufficient time for the polyelectrolyte to be dispersed throughout the mass and to accomplish its intended purpose, it is preferable that a retention period of between about 10 minutes and about 60 hours pass prior to proceeding with the calcination operation. A retention period of about 18 hours has been found particularly suitable when the moisture content of the treated material is about 15%.

At the end of the desired retention period, the treated mass is introduced into hammer-mill 8 to break up any lumps that may have formed. The material leaving hammer-mill 8 will ordinarily have a particle size of less than about 200 mesh.

The treated mass passes from hammer-mill 8 to calciner 9 that is generally maintained at a temperature within the range of from about 950° C. to about 1500° C. The structure of the treated diatomaceous earth appears to suffer a collapse during calcination, and the clay and other impurities tend to separate from the diatoms during this stage. The calciner retention time is generally between about 15 to 25 minutes.

It should be noted that the present invention does not require the presence of a fluxing agent during calcination. Frequently the use of a fluxing agent results in the sintering of many of the small interstices of the material being calcined and the agglomeration of the individual diatoms and parts of diatoms. This sintering results in an increase in the porosity of the material, with a consequent increase in its flow velocity characteristics, but necessarily results in a reduction in the clarity of the filtrate obtainable when the material is used as a filter-aid. The process of the present invention, in which no fluxing agent is employed, is believed to result in the agglomeration of the small individual diatom particles without an undesired fusion of the interstices of the material. As a result, the product of the present invention not only has a relatively high filtration rate, but achieves such a rate without sacrifice in the clarity of the obtainable filtrate. In addition, a product having a neutral pH is obtained in the absence of a fluxing agent whereas the use of a conventional fluxing agent necessarily results in a change in the acidity of the filtered product.

Calcined products sometimes appear somewhat yellow in color. If the product is to be used in an application for which a white color is desired, the material may be conveniently bleached by the addition of any conventional bleaching agent, such as sodium chloride, sodium carbonate, or the like prior to calcination.

Also through the use of a polyelectrolyte together with any conventional fluxing or bleaching, an improvement of the filter-aid qualities is obtained.

Following calcination, the material is passed into rotary cooler 10 in which it is generally cooled to a temperature of from about 150° C. to about 240° C. The material is then passed to hammer-mill 11 in which the material is again milled to break up any lumps that may have formed in the calciner. From hammer-mill 11 the material is passed to a standard air classification system 12 in which the liberated clay particles are separated from the diatoms and the product is graded into various desired sizes. The filter aid product generally has a particle size range of from above about 2 microns to about 30 microns. An additional feature of the present invention is the capability of recycling the fine fraction recovered from the overflow of the collecting cyclones in a bag filter constituting part of the conventional air classification system. This material may be recycled to reactor 7 in order to provide another opportunity for treatment with the polyelectrolyte again to form it into material of suitable size for high grade filter-aid.

The proceses of the present invention results in the recovery of a higher percentage of product usable as filter-aid material than any previously known commercial processes. The present invention permits the effective removal of clay and other impurities while minimizing the loss of diatomite. Total recoveries on the order of 80 to 90% of the diatoms in the raw material as high grade filter-aid have been obtained in comparison with recoveries of about 40% to 60% of the diatoms in the raw material as high grade filter aid recovered by conventional processes.

Figure 2:
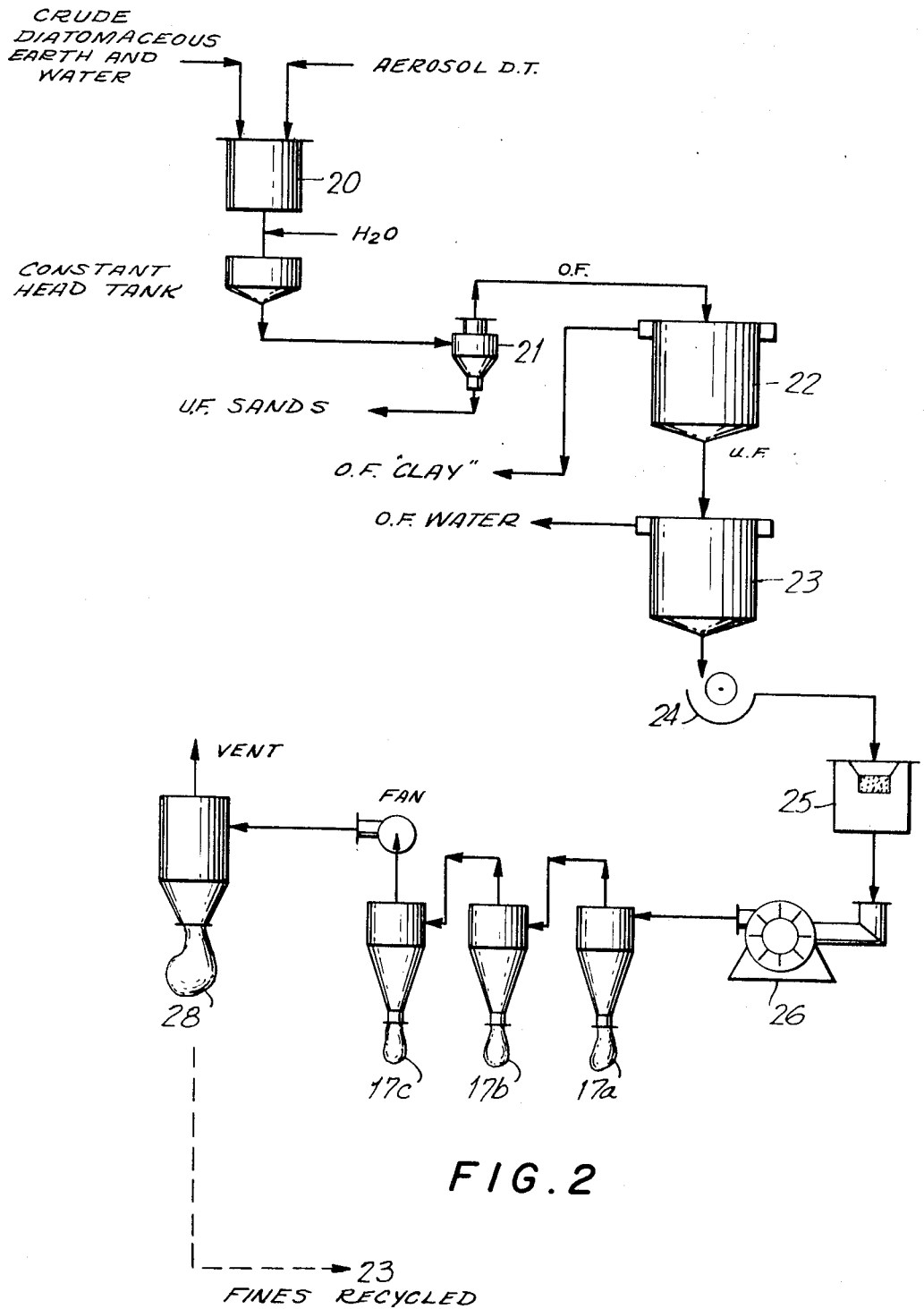
FIG. 2 is a flow diagram illustrating another embodiment of the present invention.

FIG. 2 illustrates another embodiment of the process of the present invention. This embodiment is particularly well suited for use in conjunction with diatomaceous earth deposits having a relatively high percentage of sand. For example, with respect to diatomaceous earth deposits having a sand content range of about 5% or more, the sand content is most effectively removed by hydraulic means.

Therefore, the raw material is not initially dried but is fed as mined into a conventional wet attritioner for removal of the high sand content. In this embodiment, the polyelectrolyte is added to a slurry of the material following the wet removal of the relatively high sand content thereof. As shown in FIG. 2, the raw material and water are fed into conventional wet attritioner 20 in which the particle size of the raw earth is broken down into discrete particles. If desired, a common dispersing agent such as the Aerosol D.T. dispersant may be added to effect good dispersion of the raw material. While the dilution of the raw material is not critical, satisfactory results have been obtained with a dilution of about three parts of water to one part of raw diatomaceous earth.

The discharge from attritioner 20 is diluted so as not to exceed about 30% solids, and the diluted pulp is classified in conventional hydrocyclone 21. The bottom discharge from the cyclone, which contains a large part of the sand content of the raw material, is discarded. The cyclone overflow is fed to a conventional gravity hydroseparator 22. The overflow from this hydro-separator, comprising fine sand and clay, is also discarded. The bottom discharge from vessel 22 is then introduced, together with the polyelectrolyte, to gravity thickener 23. The overflow of this unit is likewise discarded. The bottom discharge is subjected to a conventional filtering operation, as on vacuum leaf filter 24.

Since, in this embodiment, the polyelectrolyte is added directly to a slurry of the diatomaceous raw material, it is possible to obtain more intimate contact and dispersion of the polyelectrolyte in the mass of diatomaceous raw material than is possible in the embodiment illustrated in FIG. 1 described above. For this reason, it is not necessary to employ the extended retention time referred to with reference to the previous embodiment.

The filter cake from filter 14 is thereafter introduced into calciner 25 that is maintained at a temperature of from about 950° C. to about 1500° C. Retention time in the calciner is normally about 15 to 25 minutes. As indicated above with reference to the embodiment shown in FIG. 1, no fluxing agent need be employed during the calcination of the earth treated in accordance with the present invention.

Following calcination, the material is fed to the feed hopper of a conventional air swept hammer-mill 26, such as an air swept Raymond hammer-mill, in which any lumps that may have formed in the calcination operation are broken up. Discharge from hammer-mill 26 is pneumatically conveyed to a conventional 3-stage cyclone 17a to 17c and bag collector 18. This separation system is of conventional design well known in the art. The bottom discharge from the first collecting cyclone 17a comprises inerts and gross material that are discarded. The bottom discharge from the second and third cyclones, i.e., cyclones 17b and 17c, constitutes the main diatomaceous earth products. The overflow from cyclone 17c is drawn into bag collector 18. The bottom discharge from the bag collector consists of fines that may be recirculated back to the polyelectrolyte addition step (vessel 23). The advantages of this recirculation in increasing the overall production of high grade filter-aids have been indicated above. As in the case of the embodiment shown in FIG. 1, the embodiment shown in FIG. 2 also permits the recovery of from about 80 to 90% of the diatom content in the form of high grade filter-aids. Conventional processes result in a recovery on the order of 40 to 60% of the diatom content of the raw material as high grade filter-aid. The remainder of the diatoms recovered in conventional processes have been in forms that are not suitable as high grade filter-aids and are to be used for other, lower value products. It should be understood that the high recovery of filter-aid material in the present invention is not dependent upon the recirculation of the fines recovered in the conventional air classification recovery system although, of course, such recirculation increases the overall recovery of high grade material. It is within the scope of the present invention to retain the fines recovered in the bag collector for use or sale for other purposes, such as filler, abrasives and the like.

In order to further describe the present invention, the following examples of the beneficial results obtainable thereby are presented. These specific examples should not be construed as limiting the scope of the invention disclosed herein, the novel features of which are set forth in the claims. In one series of runs, crude diatomaceous earth was treated with four different polyelectrolytes. In a fifth series of runs, the crude raw material was treated in the same manner as in the four other series of runs except that water only, with no polyelectrolyte present, was mixed with the crude raw material in reactor 7 of the embodiment illustrated in FIG. 1. The dry material used in all of these runs had from between 80% and 85% diatoms on a dry solids basis. The clay content was approximately 10% and the sand content was from about 2% to about 5%. The water content of the material being treated was from about 50% to 54%, by weight of the raw material. In each series of runs, the retention times following mixture in reactor 7 were varied. The polyelectrolytes employed were American Cyanamid's Superfloc 16 and Superfloc 84, and Dow Chemical's NP-10 and NP-20. In each instance, the amount of polyelectrolyte employed was approximately 100 p.p.m. of raw earth. The material was initially dried sufficiently so as to achieve a moisture content, following addition of the polyelectrolyte of 15% by weight. Each run was generally in accordance with the embodiment described above and illustrated in FIG. 1.

The products obtained were tested for bulk density and for filtration rate at equivalent clarity. The results of these tests are set forth in Table I and are represented graphically in FIG. 3.

TABLE I

| Reaction time, hr. | Superfloc 16 | | Superfloc 84 | | NP-10 | | NP-20 | | Water only | |
|---|---|---|---|---|---|---|---|---|---|---|
| | Bulk dens., kg./m.³ | Filt. rate, cc./15 min. | Bulk dens., kg./m.³ | Filt. rate, cc./15 min. | Bulk dens., kg./m.³ | Filt. rate, cc./15 min. | Bulk dens., kg./m.³ | Filt. rate, cc./15 min. | Bulk dens., kg./m.³ | Filt. rate, cc./15 min. |
| 1 | 90.9 | 935 | 111.1 | 985 | 95.0 | 910 | 95.2 | 910 | 85.0 | 815 |
| 4 | 92.9 | 730 | 101.0 | 865 | 74.0 | 820 | 75.0 | | 85.6 | |
| 6 | 83.9 | 815 | 80.3 | 730 | 93.4 | 785 | 95.2 | 815 | 86.0 | 800 |
| 18 | 100.6 | 1,460 | 105.3 | 1,205 | 111.1 | 1,410 | 113.8 | 1,440 | 91.8 | 790 |
| 24 | 102.8 | | 98.6 | | 91.6 | | 94.5 | | 94.2 | |
| 30 | 102.6 | | 94.5 | | 87.8 | | 84.3 | | | |
| 42 | 89.0 | | 82.4 | | 85.6 | | 82.3 | | 92.0 | |
| 48 | 78.2 | | 91.7 | | 100.8 | | 93.1 | | 91.3 | |
| 54 | 104.1 | 1,290 | 101.0 | 1,120 | 98.1 | 1,240 | 100.6 | 1,410 | 91.0 | 780 |
| 66 | 113.2 | | 98.6 | | 112.1 | | 88.5 | | 90.0 | |
| 72 | 84.0 | 1,140 | 98.8 | 1,070 | 78.7 | 1,140 | 83.9 | 1,040 | 89.6 | 760 |

Figure 3:
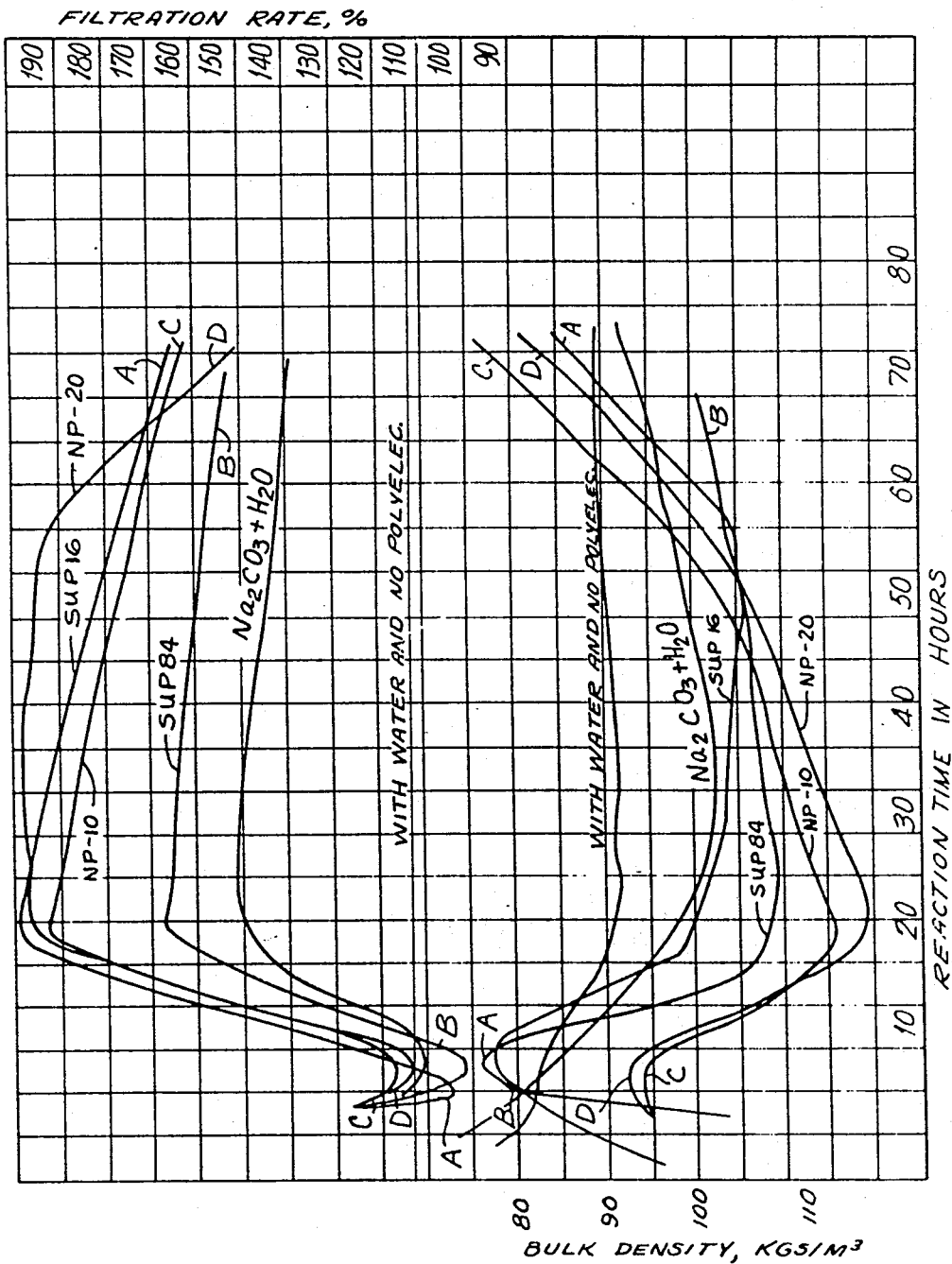
FIG. 3 is a graphical representation of the flow velocities and bulk densities obtained in a series of experimental runs in accordance with the present invention while employing different polyelectrolytes and reaction times.

As can be seen from the graph shown in FIG. 3, the bulk density of the treated material decreased, with a corresponding decrease in the filtration rate of the material when used as a filter aid, when the retention time was no more than about six hours. After six hours, bulk density and filtration rates of the treated materials increased. Optimum retention time appeared to be about 18 hours. Material treated with a polyelectrolyte in accordance with the present invention showed, in each case, highly significant advantages over the product obtained from the same diatomaceous earth raw material treated with water alone with no polyelectrolyte present. Thus, the filtration rate of the material prepared in accordance with the present invention was, in each instance, greatly improved over the material treated with water alone, or with soda ash. At an 18-hour retention time, the filtration rate of the finished product was nearly double that obtainable with the material treated with water or with soda ash but without polyelectrolyte.

In another set of runs, diatomaceous earth raw material such as that employed above was treated with Superfloc 16 in accordance with the present invention. A retention time of 18 hours was employed in each case. The moisture content following addition of the polyelectrolyte was about 15% by weight. Varying quantities of the polyelectrolyte were employed. When the filter aid products obtained were tested for bulk density and filtration rate, the results shown in FIG. 4 were obtained. Flow velocities are expressed as a percentage of the filtration rate obtainable with material treated with water alone without polyelectrolyte.

Figure 4:
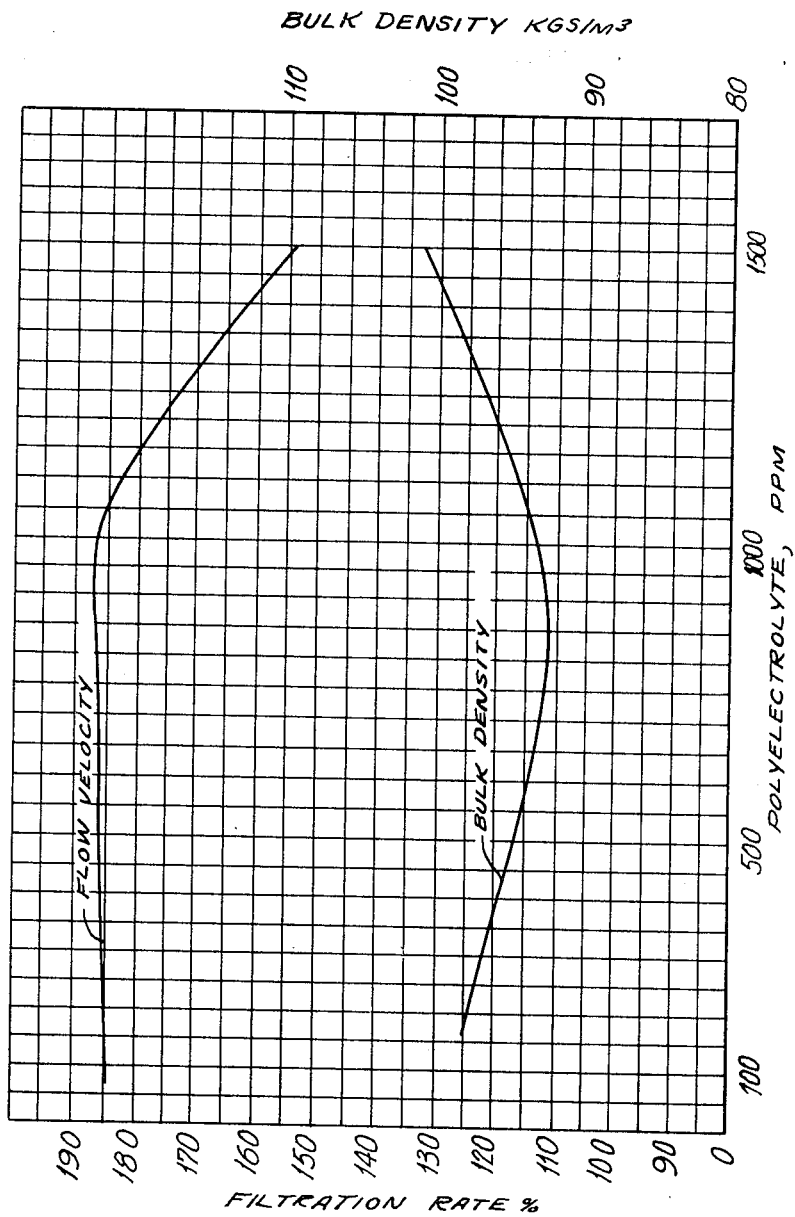
FIG. 4 is a graphical representation of the flow velocities and bulk densities obtained in a series of runs in accordance with the present invention while employing varying dosages of a particular polyelectrolyte.

As shown in FIG. 4, an increase in the amount of polyelectrolyte added results in a slight increase in the unexpectedly high filtration rate up to about 1,000 parts per million parts of earth being treated. Addition of polyelectrolyte beyond about 1,000 p.p.m. results in a decrease in the obtainable filtration rate, although the resulting rate remains much higher than that obtainable for material treated with water or soda ash containing no polyelectrolyte.

In another series of tests, three types of diatomaceous earth were employed. Types A and B were of lacustrine origin. Type C was of marine origin. The mineralogical analysis of the three types of material was as shown in Table II.

TABLE II

| Composition | Types, percent | | |
| --- | --- | --- | --- |
|  | A | B | C |
| Diatoms | 88.0 | 83.0 | 55.5 |
| Clay | 2.5 | 7.0 | 22.0 |
| Quartz | 3.0 | 3.0 | 13.0 |
| Feldspar and vulcanic glass | 5.0 | 5.0 | 11.0 |
| Iron oxide | 1.5 | 2.0 | 3.5 |

In a series of comparative tests, each type of material was treated in accordance with the present invention. Types A and B were treated with the embodiment of the invention illustrated in FIG. 1. Type C material was treated in accordance with the embodiment of FIG. 2. That is, samples of types A and B were dried and subjected to a dry-type classification for removal of the sand. The type C material was submitted to a hydraulic-type classification, without initial drying, for removal of the sand prior to addition of the polyelectrolyte, calcination and classification.

Samples were also prepared from the same types of material with no polyelectrolyte present in the water used to treat the material following sand removal. The samples prepared had the characteristics shown in Table III.

TABLE III

| Type | Water treated material | | | Polyelectrolyte treated material | | |
| --- | --- | --- | --- | --- | --- | --- |
|  | A | B | C | A | B | C |
| Bulk density, kg./m.$^3$ | 92 | 94 | 120 | 122 | 133 | 130 |
| Amount of solids retained on 325 mesh, percent | 0.4 | 0.4 | 2.5 | 0.8 | 1.2 | 3.1 |
| pH | 6.9 | 6.9 | 6.9 | 6.9 | 6.9 | 6.9 |

The calcined products were used in filtering sugar solution at 60° Brix and at a temperature of 80° C. with a pressure of 30 pounds per square inch over a period of 45 minutes. Taking the flow rate of the water treated material as 100%, the following flow rates shown in Table IV were obtained

TABLE IV

| Material | Water-treated, percent | Polyelectrolyte treated, percent |
| --- | --- | --- |
| Type: |  |  |
| A | 100 | 183 |
| B | 100 | 185 |
| C | 100 | 180 |

The diatoms of the finished product have well-preserved structures.

As indicated by the data presented above, it can readily be seen that the products of the present invention have outstanding filter aid properties. Such products are high grade filter aid materials having a desirable combination of flow rate and clarification properties. This filter aid material may be employed in a wide variety of industrial applications including chemical filtrations, filtration of fruit juices and oils, purification of water, and other filtration applications in the sugar, wine, beer, petroleum industries and the like. The diatomaceous earth product of this invention is also useful as a filler in the paint and varnish industry, the rubber industry, the paper industry and various other applications. The product also finds application as an inert material, such as an absorbant, as an insulating material, and as an abrasive. In addition, the product has been found to be especially useful in the dry cleaning industry.

This additional advantage of the product of the present invention is due to its very high oil absorbency characteristics. When compared with three commonly available, commercial diatomaceous earth products, the product of this invention was found to have a particle size, surface area and porosity comparable with the other available products. Oil absorbency was significantly higher as shown in Table V. Oil absorption was measured by the test procedure set for the standard method of testing for oil absorption, ASTM Designation D-281-31 (1966).

TABLE V

| Material | Fisher average particle size, µs | Surface area, sq. cm./g. mat. | Porosity, percent | Oil absorption, gr. oil/ 100 g. sample |
| --- | --- | --- | --- | --- |
| Material of present invention | 2.00 | 1.25×10$^4$ | 82.0 | 230 |
| Commercial Product: |  |  |  |  |
| 1 | 2.95 | 8.66×10$^3$ | 78.0 | 182 |
| 2 | 1.35 | 1.89×10$^4$ | 82.5 | 192 |
| 3 | 3.55 | 7.56×10$^3$ | 80.5 | 184 |

Large quantities of commercial diatomaceous earth products are presently utilized in the dry cleaning industry. Product 1 above is presently used by dry cleaners as a filter aid. Its action is supplemented by another product that is capable of absorbing oils and fatty acids. This absorption facilitates the regeneration of the cleaning solvent that becomes saturated with oils and fatty acids from the grease removed from the clothes being cleaned. The product used to absorb oils and fatty acids is a special by-product of diatomaceous earth having a chemical consistency approximating that of $CaSiO_3$. This product is relatively high in cost. The product of the present invention can replace both of the products presently used, and at reduced cost, because of its exceptional combination of high filter aid properties and high oil absorbency. Such advantages are of tremendous significance in the dry cleaning industry and in other applications in which a combination of filter aid and oil absorption properties are desired. A futher outstanding property of the product of the present invention, when used in dry cleaning, is its ability to substantially reduce the redeposition of dirt and lint on the treated clothes. In addition, the treated clothes are exceptionally soft, pliable and resilient, making this application of the product of the present invention of added importance to the dry cleaning industry.

While the invention has been described herein with reference to certain embodiments thereof, it will be appreciated by those skilled in the art that various changes and modifications can be made without departing from the scope of the invention described and claimed herein.

What is claimed is:

1. A new composition of matter prepared by mixing diatomaceous earth with from about 5 to about 10,000 p.p.m. parts on a weight basis, of a polyelectrolyte polyacrylamide polymer and thereafter calcining the mixture, the calcined composition being characterized by a high filtration rate, high bulk density and an oil absorbency of at least 230 grams of oil per 100 grams of diatomaceous earth.

2. A new composition prepared according to claim 1 in which the polyelectrolyte polyacrylamide polymer is added in an amount of from about 100 to about 1000 p.p.m. parts on a weight basis of diatomaceous earth.

3. A composition prepared according to claim 1 in which the moisture content of the mixture after addition of the polyelectrolyte is at least from about 5 to about 15 percent by weight.

References Cited

UNITED STATES PATENTS

| | | | |
|---|---|---|---|
| 1,813,916 | 7/1931 | Cummins | 252—449X |
| 1,970,204 | 8/1934 | Stockton | 252—449 |
| 1,985,526 | 12/1934 | Stockton | 252—449 |
| 1,992,547 | 2/1935 | Schuetz | 252—449 |
| 2,491,051 | 12/1949 | McCarter | 252—449X |
| 2,564,926 | 8/1951 | Rapier | 252—428 |
| 2,693,456 | 11/1954 | Fenneli | 252—449 |
| 2,701,240 | 2/1955 | Bregar | 252—449X |
| 3,080,264 | 3/1963 | Zimmie et al. | 252—89X |

DANIEL E. WYMAN, Primary Examiner

P. E. KONOPKA, Assistant Examiner

U.S. Cl. X.R.

106—288I, 286, 308N; 134—22; 252—426, 89, 449; 260—41.5